Aug. 14, 1945.  C. L. EKSERGIAN ET AL  2,382,552
BRAKE MECHANISM
Filed Jan. 29, 1944
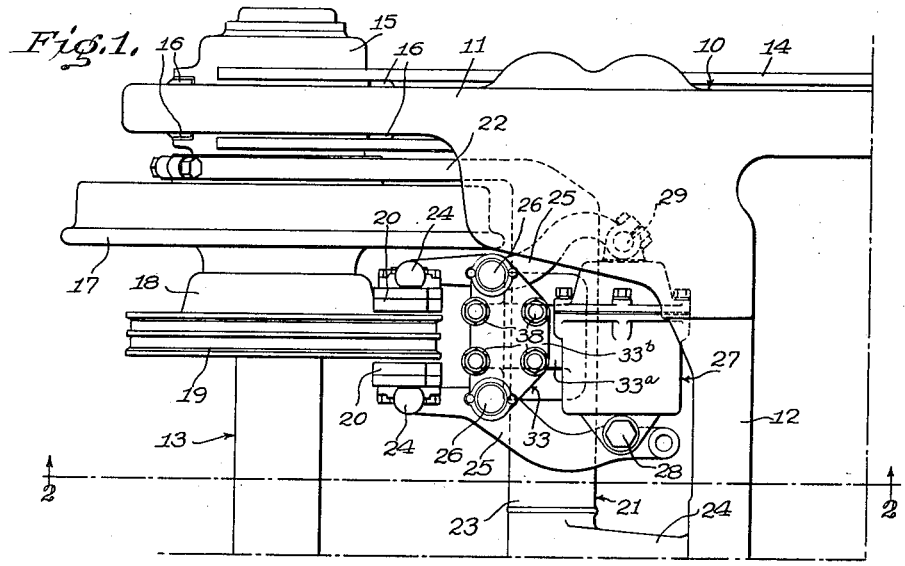
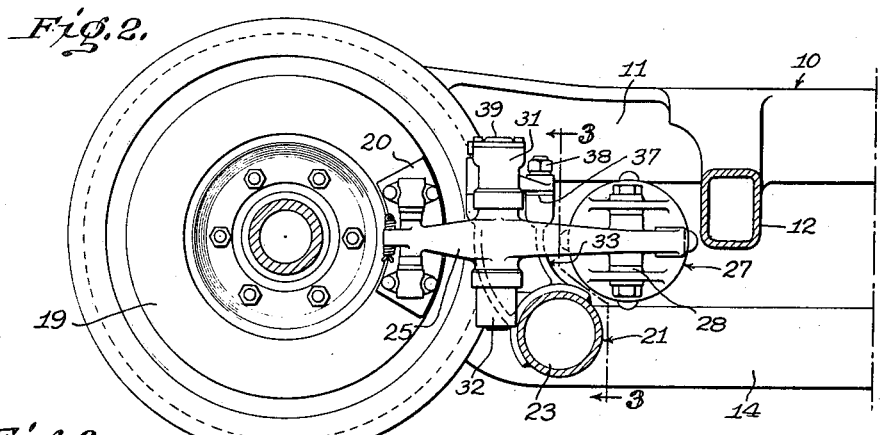
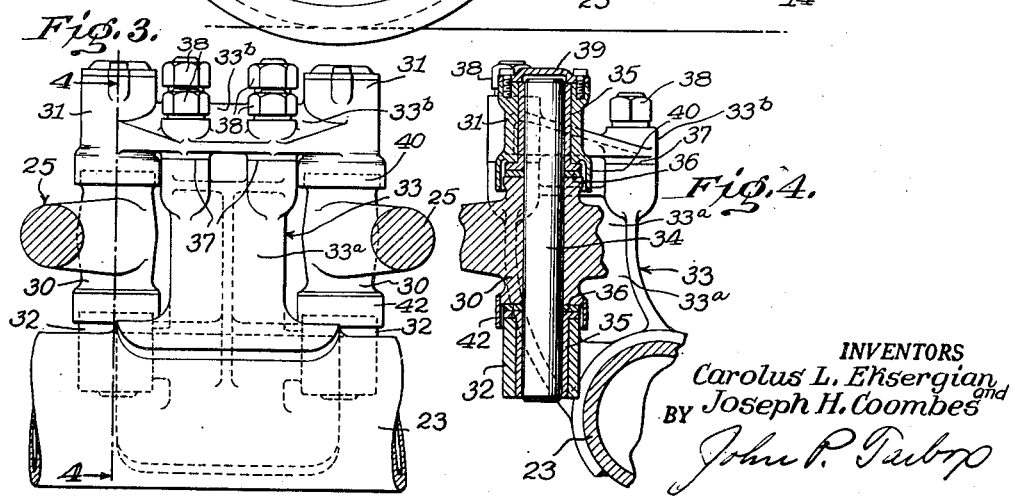
INVENTORS
Carolus L. Eksergian and
Joseph H. Coombes
BY John P. Tribro
ATTORNEY Patented Aug. 14, 1945

2,382,552

UNITED STATES PATENT OFFICE 2,382,552

BRAKE MECHANISM

Carolus L. Eksergian and Joseph H. Coombes, Detroit, Mich., assignors to Budd Wheel Company, Philadelphia, Pa., a corporation of Pennsylvania Application January 29, 1944, Serial No. 520,211

5 Claims. (Cl. 188—59)

The invention relates to a brake mechanism and more particularly to such a mechanism applied to vehicles, such as railway trucks.

The invention is more particularly concerned with the general type of brake shown in Patent No. 2,236,898 issued April 1, 1941, in which a brake rotor such as a brake disc is mounted to rotate with a wheel of a wheel and axle assembly and brake stators, such as segmental shoes, are operatively associated with the opposite sides of said rotor, said stators being operated by a pair of brake levers, which in turn are actuated by a brake cylinder, and the stators and their actuating levers and cylinder being mounted on a yoke support carried at its ends on the wheel and axle and at an intermediate point on the truck frame supported by said wheel and axle assembly.

A principal object of the invention is to simplify the construction and mounting of the brake levers on the support, whereby to decrease the weight and cost of manufacture.

A further object is to provide a mounting which facilitates the assembly or disassembly of the levers to and from the support.

A still further object is to provide a simple and readily applied seal to protect the bearings of the levers against the elements.

These objects are attained by the construction described in detail in the following specification, although it will be understood that this is but one typical embodiment of the invention.

In the drawing:

Fig. 1 is a plan view of one quarter section of a railway truck showing the invention applied thereto, it being understood that the other quarters may be similarly arranged, Fig. 2 is a vertical longitudinal sectional view taken substantially on the line 2—2 of Fig. 1, Fig. 3 is an end elevational view on an enlarged scale of the brake lever mounting, the levers being shown in section, the view being taken along the line 3—3 of Fig. 2, and Fig. 4 is a fragmentary sectional view taken substantially along the line 4—4 of Fig. 3.

The truck to which the invention has been shown applied comprises the usual frame 10 having side members, as 11, interconnected by transoms, as 12. The truck frame is supported from wheel and axle assemblies, as 13, one adjacent each end thereof, through the equalizer bars, as 14, and spring nests (not shown) between the side frame members and the adjacent equalizer bars. The equalizer bars 14 rest on top of the respective journal boxes, as 15, at the ends of the wheel and axle assemblies, and the frame has the usual pedestals, as 16, embracing the adjacent journal boxes and guided thereon for relative vertical sliding movement.

To each wheel 17 of a wheel and axle assembly, as 13, is secured for rotation therewith, the web 18 of a brake rotor comprising a brake disc or ring 19. The brake stators or brake shoes, as 20, are arranged in cooperative relation with the opposite sides of the disc 19. The support for the brake shoes associated with a wheel and axle assembly comprises a C or U-shaped yoke 21 having longitudinally extending arms, as 22, carried by the journal boxes, as 15, at one of their ends and interconnected at their other ends by a transverse tubular member 23, the central portion of the member 23 having an arm 24 through which it is supported from the adjacent transom 12, all substantially as disclosed in the prior patent hereinbefore referred to.

The brake shoes 20 are supported from the tubular transverse member of the support by the novel mounting forming the subject of the invention. The shoes are pivotally carried, as indicated at 24, by respective levers 25 pivoted intermediate their ends at 26, and having their ends remote from the shoes interconnected by a cylinder and piston actuator 27, one lever being pivotally connected to the cylinder at 28 and the other being pivotally connected to the piston at 29. The operation of the brake mechanism so far described is similar to that of the mechanism shown in the hereinbefore referred to patent and a further description of its operation is believed unnecessary.

Each of the levers 25 has a central hub portion 30 extending above and below the arms extending therefrom and this hub portion is disposed between upper and lower bearings 31 and 32 carried by a mounting bracket 33 rigidly secured, as by welding, to the tubular transverse member 23 of the yoke support. The hub portion of each lever is provided with reduced pivot extensions from each end thereof which are conveniently formed by a pin 34 press fitted in an opening in the hub portion. These pivot extensions fit the upper and lower bearings 31 and 32, when the parts are assembled, suitable wear-resisting bushings 35 and washers 36 being provided to take the radial and thrust loads.

For convenience of assembly and disassembly, the bearing bracket 33 is divided along a generally horizontal plane into two sections 33a and 33b. The lower section 33a carries the transversely spaced lower bearings 32 and the upper section 33b carries the similarly spaced upper bearings 31. When the sections 33a and 33b are assembled their machined seating portions meeting along the horizontal line indicated at 37, Figs. 3 and 4, are strongly bolted together by a series of stud bolts 38, which are provided with lock nuts, as indicated in Fig. 3. To disassemble the levers from the support all that is necessary is to release the stud bolts, lift the upper bracket section 33a carrying the upper bearings 31 off the upper pivot extensions 34 of the levers 25, after which the levers with their lower pivot extensions may be lifted out of the lower bearing. To assemble the parts, the operations will be reversed.

Another feature of the invention consists in the provision of simple but adequate weather seals for the bearings of the lever pivots. To this end each of the upper bearings 31 is closed at the top by a closure cap 39 firmly secured to a machined seat thereon. To seal the joint between the upper bearing 31 and the hub portion 30 of each lever, the upper bearing is formed with a depending annular skirt 40 extending down over this joint in slightly spaced relation to the hub portion of the associated lever. Similarly, the joint between the hub portion 30 of each lever and the adjoining lower bearing 32 is sealed by a similar annular skirt 42 depending from the bottom of the hub portion and likewise slightly spaced from the associated lower bearing 32.

While a specific embodiment of the invention has been herein described, it will be understood that changes and modifications may be made without departing from the main features of the invention, and it is desired to cover such changes and modifications in the following claims.

What is claimed is:

1. In a brake mechanism of the class having a rotor element having opposed braking faces and a pair of stator elements arranged to engage the opposite faces of said rotor element to apply the brake, a support for said stator elements extending transversely adjacent the periphery of said rotor element including a bearing bracket for pivotally supporting a pair of brake levers in transversely spaced relation, one cooperating with each of said stator elements, each of said levers having a hub portion and reduced pivot extensions from the opposite ends thereof for engagement with upper and lower bearings on said bracket, the bearing bracket being divided into separable top and bottom portions carrying, respectively, the top and bottom bearings and means removably securing said separable portions of the bearing bracket together.

2. In a brake mechanism, a support for a pair of spacedly pivoted brake levers, each of said levers having a hub portion supported between spaced bearings and having pivot portions at its opposite ends fitting the associated bearings, said support comprising a bearing bracket carrying the bearings for said levers, said bracket being formed of separable parts, one carrying the bearings of both levers disposed at one end of their hub portions and the other carrying the bearings of both levers disposed at the other end of their hub portions, and means for removably securing said two parts together with the spaced bearings for each lever in axial alignment.

3. In a brake mechanism of the class having a rotor element having a substantially radial braking face, a stator element arranged to engage said face to apply the brake, a support for said stator extending transversely adjacent the periphery of said rotor element including a bearing bracket for pivotally supporting a brake lever cooperating with said stator element, said lever having a hub portion and reduced pivot extensions from the opposite ends thereof for engagement with upper and lower bearings on said bracket, the bearing bracket being divided into separable top and bottom portions, carrying respectively, the top and bottom bearings and means removably securing said separable portions of the bearing bracket together.

4. In a brake mechanism, a rotor element having substantially radial braking faces on the opposite sides thereof, a pair of brake stators in cooperative relation to said faces and a support member for said stators extending transversely adjacent the periphery of said rotor, a pair of brake levers pivoted intermediate their ends on said member, said brake levers carrying, at one side of their pivots, the respective stators, and at the other side of their pivots, a cylinder actuator extending between them, said pivotal connection of the levers to said member being through split bearing carrying elements removably secured together, the separation of said bearing carrying elements permitting the removal of the brake levers and the parts carried thereby as a unit from said member.

5. In a brake mechanism, a rotor element having substantially radial braking faces on the opposite sides thereof, a pair of brake stators in cooperative relation to said faces and a support member for said stators extending transversely adjacent the periphery of said rotor, a pair of brake levers having trunnions rigid therewith intermediate their ends and pivoted through said trunnions on the support member, a brake cylinder actuator floatingly carried between adjacent ends of said levers and the brake stators being carried respectively by the opposite ends of the levers, the pivotal connection of said levers to said support member comprising a bearing supporting bracket carried by said member and engaging said trunnions, the bracket being divided into separable parts removably secured together, the separation of said parts freeing the trunnions of the levers, to permit removal of the levers together with the stators and actuating cylinder carried by the levers as a unit from the support member.

CAROLUS L. EKSERGIAN.
JOSEPH H. COOMBES.